United States Patent
Tran et al.

(10) Patent No.: US 9,533,575 B2
(45) Date of Patent: Jan. 3, 2017

(54) VEHICLE ORIENTATION DEVICE AND METHOD

(75) Inventors: Thuy-Yung Tran, Whitley (GB); Edward Hoare, Whitley (GB); Nigel Clarke, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 576 days.

(21) Appl. No.: 13/994,546

(22) PCT Filed: Dec. 15, 2011

(86) PCT No.: PCT/EP2011/072990
§ 371 (c)(1),
(2), (4) Date: Jul. 24, 2013

(87) PCT Pub. No.: WO2012/080431
PCT Pub. Date: Jun. 21, 2012

(65) Prior Publication Data
US 2015/0033846 A1 Feb. 5, 2015

(30) Foreign Application Priority Data

Dec. 15, 2010 (GB) .................................. 1021268.6
Dec. 15, 2010 (GB) .................................. 1021272.8
(Continued)

(51) Int. Cl.
*B60K 35/00* (2006.01)
*G01F 23/04* (2006.01)
(Continued)

(52) U.S. Cl.
CPC .............. *B60K 35/00* (2013.01); *B60G 17/019* (2013.01); *B60G 17/0165* (2013.01);
(Continued)

(58) Field of Classification Search
CPC ...... G01F 23/0061; G01F 23/18; G01F 23/04; B60G 17/0165; B60G 17/019; B60K 35/00
(Continued)

(56) References Cited

U.S. PATENT DOCUMENTS 3,392,694 A    7/1968  Appleton
4,039,790 A *  8/1977  Treckman .............. H01H 35/14
                                                    200/61.53
(Continued)

FOREIGN PATENT DOCUMENTS

DE         19941126 A1   4/2001
DE    102004028157 B3    1/2006
(Continued)

OTHER PUBLICATIONS

International Search Report for PCT/EP2011/072990 dated Apr. 10, 2012, 5 pages.
(Continued)

*Primary Examiner* — Hezron E Williams
*Assistant Examiner* — David Z Huang
(74) *Attorney, Agent, or Firm* — Reising Ethington P.C.

(57) ABSTRACT

A vehicle includes a plurality of water level sensors, for example comprising capacitive or resistive sensors, from the outputs of which can be determined vehicle orientation when wading. In conjunction with a vehicle orientation sensor, the outputs from any one water level sensor permits calculation of water depth at any point on the vehicle body.

15 Claims, 7 Drawing Sheets

(30) Foreign Application Priority Data

| Dec. 15, 2010 | (GB) | ................................. | 1021278.5 |
| Dec. 15, 2010 | (GB) | ................................. | 1021295.9 |
| Dec. 15, 2010 | (GB) | ................................. | 1021296.7 |
| Dec. 15, 2010 | (GB) | ................................. | 1021297.5 |

(51) Int. Cl.

| G01F 23/28 | (2006.01) |
| B60G 17/019 | (2006.01) |
| G01F 23/18 | (2006.01) |
| B60G 17/0165 | (2006.01) |
| B60W 40/06 | (2012.01) |
| B60W 40/076 | (2012.01) |
| B60W 50/14 | (2012.01) |
| B60K 37/02 | (2006.01) |
| F02D 11/10 | (2006.01) |
| G01F 23/14 | (2006.01) |
| G01S 15/02 | (2006.01) |
| G10K 13/00 | (2006.01) |
| B60Q 1/00 | (2006.01) |
| B60R 99/00 | (2009.01) |
| G01F 23/24 | (2006.01) |
| G01F 23/26 | (2006.01) |
| G06F 7/00 | (2006.01) |
| G01K 13/00 | (2006.01) |
| G01F 23/00 | (2006.01) |
| G01F 23/296 | (2006.01) |

(52) U.S. Cl.
CPC ........ *B60G 17/01908* (2013.01); *B60K 37/02* (2013.01); *B60Q 1/00* (2013.01); *B60R 99/00* (2013.01); *B60W 40/06* (2013.01); *B60W 40/076* (2013.01); *B60W 50/14* (2013.01); *F02D 11/105* (2013.01); *G01F 23/0061* (2013.01); *G01F 23/0076* (2013.01); *G01F 23/14* (2013.01); *G01F 23/18* (2013.01); *G01F 23/24* (2013.01); *G01F 23/242* (2013.01); *G01F 23/263* (2013.01); *G01F 23/265* (2013.01); *G01F 23/28* (2013.01); *G01F 23/2965* (2013.01); *G01K 13/00* (2013.01); *G01S 15/02* (2013.01); *G06F 7/00* (2013.01); *G10K 13/00* (2013.01); *B60G 2300/07* (2013.01); *B60G 2400/80* (2013.01); *B60G 2400/843* (2013.01); *B60G 2500/30* (2013.01); *B60G 2800/914* (2013.01); *B60K 2350/1076* (2013.01); *B60W 2050/146* (2013.01); *B60W 2420/54* (2013.01); *B60W 2520/16* (2013.01); *B60W 2520/18* (2013.01); *B60W 2550/14* (2013.01); *B60W 2550/142* (2013.01); *B60W 2550/147* (2013.01); *G01F 23/00* (2013.01); *G01F 23/296* (2013.01); *Y02T 10/84* (2013.01); *Y10S 367/908* (2013.01); *Y10S 903/93* (2013.01)

(58) Field of Classification Search
USPC ............................................ 73/304 C, 304 R
See application file for complete search history.

(56) References Cited

U.S. PATENT DOCUMENTS

| 4,107,994 | A | | 8/1978 | Sogo |
| 4,144,517 | A | | 3/1979 | Baumoel |
| 5,173,692 | A | | 12/1992 | Shapiro et al. |
| 5,521,594 | A | | 5/1996 | Fukushima |
| 5,850,624 | A | * | 12/1998 | Gard ................. G01R 33/0206 |
| | | | | 33/356 |
| 5,978,736 | A | | 11/1999 | Greendale |
| 6,430,985 | B1 | | 8/2002 | Drees |
| 8,473,173 | B1 | | 6/2013 | Robles |
| 9,026,310 | B2 | | 5/2015 | Tran et al. |
| 2003/0000303 | A1 | * | 1/2003 | Livingston ............ G01F 23/268 |
| | | | | 73/304 C |
| 2003/0005765 | A1 | | 1/2003 | Brudis et al. |
| 2003/0050743 | A1 | * | 3/2003 | Caretta ................. B60C 23/066 |
| | | | | 701/1 |
| 2005/0170710 | A1 | | 8/2005 | Darby et al. |
| 2005/0252290 | A1 | * | 11/2005 | Eguchi ................. B41J 2/14427 |
| | | | | 73/304 R |
| 2005/0284218 | A1 | | 12/2005 | Lagergren |
| 2006/0113129 | A1 | | 6/2006 | Tabata |
| 2007/0007056 | A1 | | 1/2007 | Bowers et al. |
| 2007/0167092 | A1 | | 7/2007 | Rees et al. |
| 2007/0221430 | A1 | | 9/2007 | Allison, Sr. |
| 2007/0244606 | A1 | | 10/2007 | Zhang et al. |
| 2008/0030313 | A1 | | 2/2008 | Obradovich |
| 2008/0319618 | A1 | | 12/2008 | Sjogren et al. |
| 2009/0030581 | A1 | | 1/2009 | Pollklas et al. |
| 2009/0150035 | A1 | | 6/2009 | Soliman et al. |
| 2009/0159020 | A1 | | 6/2009 | Hall et al. |
| 2009/0271076 | A1 | * | 10/2009 | Griffin ............... G01G 19/4142 |
| | | | | 701/45 |
| 2010/0057324 | A1 | | 3/2010 | Glugla et al. |
| 2010/0085198 | A1 | | 4/2010 | Boss et al. |
| 2010/0101226 | A1 | | 4/2010 | Shutty et al. |
| 2013/0307679 | A1 | | 11/2013 | Tran et al. |
| 2013/0336090 | A1 | | 12/2013 | Tran et al. |
| 2014/0085066 | A1 | | 3/2014 | Tran et al. |
| 2014/0156126 | A1 | | 6/2014 | Tran et al. |
| 2014/0184247 | A1 | | 7/2014 | Tran et al. |
| 2014/0288793 | A1 | | 9/2014 | Tran et al. |
| 2014/0293746 | A1 | | 10/2014 | Tran et al. |
| 2014/0347178 | A1 | | 11/2014 | Tran et al. |

FOREIGN PATENT DOCUMENTS

| DE | 102005038345 A1 | 2/2007 |
| DE | 102008042016 A1 | 3/2010 |
| FR | 2622639 A1 | 5/1989 |
| GB | 2356602 A | 5/2001 |
| GB | 2376929 A | 12/2002 |
| KR | 20110109614 A | 10/2011 |
| KR | 20110109618 A | 10/2011 |
| NL | 1011780 C2 | 10/2000 |
| RU | 2168419 C1 | 6/2001 |
| WO | WO03002378 A1 | 1/2003 |
| WO | WO2009013606 A2 | 1/2009 |

OTHER PUBLICATIONS

Combined Search and Examination Report corresponding to GB1121629.8, dated May 3, 2012, 6 pages.

\* cited by examiner

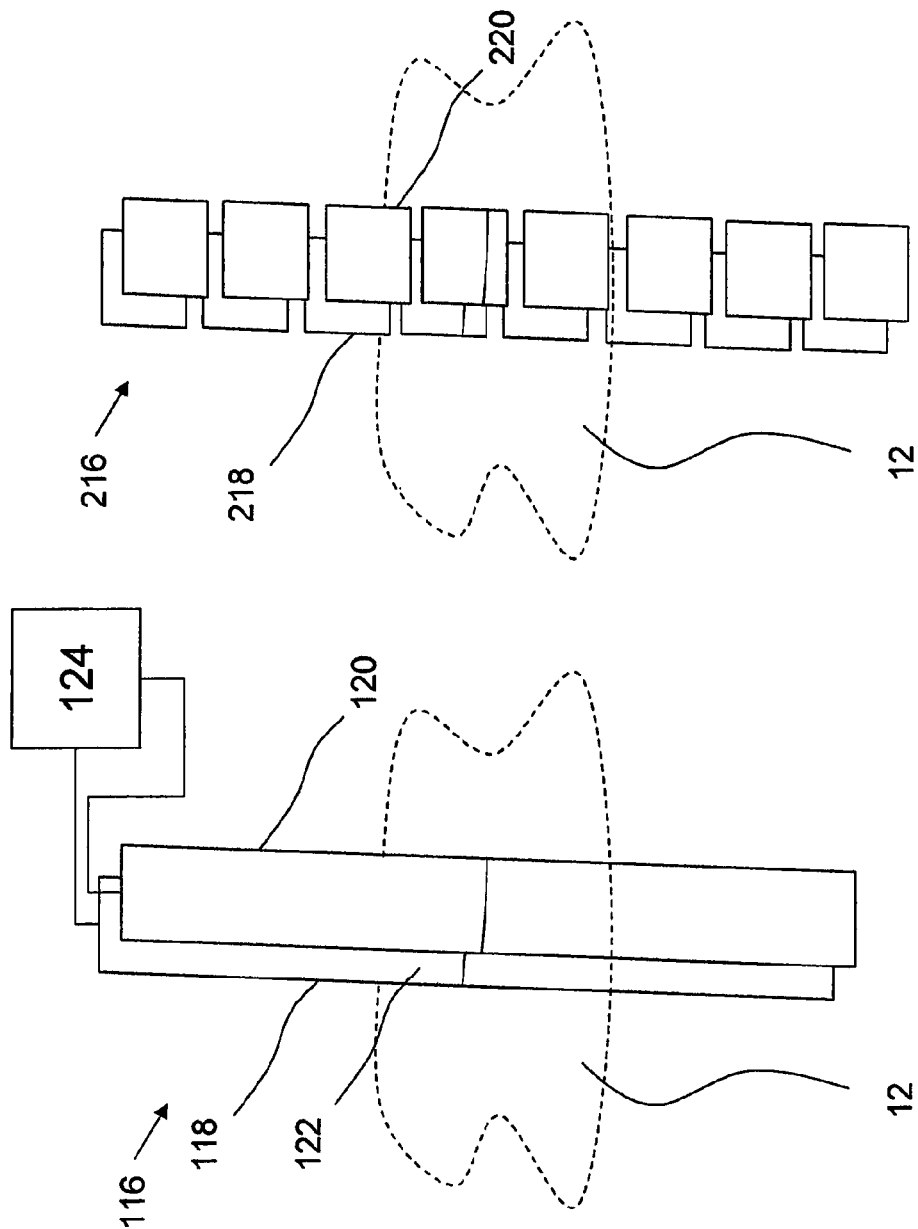

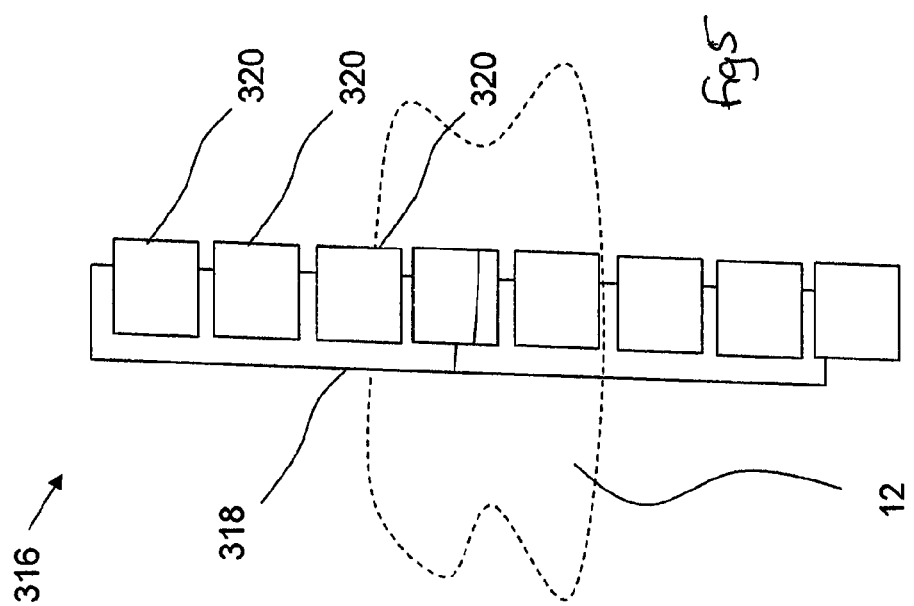

VEHICLE ORIENTATION DEVICE AND METHOD

TECHNICAL FIELD

The present invention is concerned with an apparatus for determining vehicle orientation by measuring the water level relative to a vehicle body. More particularly, but not exclusively, the present invention is concerned with the measurement of the water level of a wading vehicle and using such information to give guidance to a driver of the vehicle. Aspects of the invention relate to a system, to a vehicle and to a method.

BACKGROUND

An off-road vehicle may be defined as a road vehicle having some off-road capability designed therein, such as four wheel drive. Off road vehicles are often required to travel through water to reach their intended destination. Travel through deep water (over about 0.3 m in depth) is known as "wading". Known off-road vehicles are designed to wade, and comprise suitably sealed closures to avoid ingress of water into the passenger compartment. The engine air intake is positioned at an elevated position (normally directly in front of and below the windscreen) to prevent water being ingested into the engine, and this intake will often dictate the maximum level of water relative to the body that the vehicle can wade through without risking water ingestion and engine damage.

Prior art methods of determining if the water level is safe to wade through include referring to depth gauges, e.g. permanent graduated poles situated within the water in the case of fords and measurement of the depth by the driver using a partially submerged stick or pole.

The former method requires such a gauge to be present, and the latter method involves the driver exiting the vehicle. The latter method in particular will often not reveal the deepest point unless the driver wades in, which is undesirable and dangerous.

Both methods only reveal the absolute depth of the water (from the ground to the water surface). This is often not sufficient to make an accurate assessment of the vehicle's capability to pass. The knowledge that the driver requires is, instead, what the water level is relative to a point on the vehicle body (e.g. the air intake). The distance between the bottom of the vehicle tyres and the air intake is variable (due to suspension travel, tyre pressure variations etc) and as such with known methods the driver must take account of a potential margin of error in making his decision. This is undesirable as the driver may decide not to proceed through water which the vehicle is, in fact, capable of wading through.

An aim of the present invention is to at least mitigate the above mentioned problems.

SUMMARY

Aspects of the invention relate to a system, to a vehicle and to a method as claimed in the appended claims.

According to another aspect of the invention for which protection is sought, there is provided a method of determining the orientation of a wading vehicle comprising the steps of providing a plurality of water level sensors about the vehicle, determining the water level indicated at a plurality of said sensors, and calculating the angular orientation of the vehicle from the outputs of said sensors.

The level of the surface of a body of water may be assumed horizontal, or very nearly so. Depth sensors situated about the vehicle, for example at the corners thereof, permit calculation of orientation of the vehicle with respect to the horizontal.

Optionally, the method comprises the steps of providing on the vehicle a capacitive or resistive water level sensor, and determining wading depth according to the capacitance or resistance thereof, respectively.

The method may comprise the steps of providing a vertical array of said sensors, each sensor being independent so as to indicate a discrete wading depth.

Optionally, the method comprises the step of interrogating each of the sensors in the array individually.

In embodiments of the invention each of the sensors in the array are interrogated individually in a predefined sequence.

Optionally, the method comprises the step of interrogating two or more sensors in the array simultaneously.

The method may comprise the step of determining the highest electrode pair in the array which has experienced a change in resistance or capacitance.

Optionally, the method includes the steps of determining orientation of the vehicle from an orientation sensor, and determining a water level on the vehicle at a position spaced from any of said water level sensors.

According to another aspect of the invention for which protection is sought there is provided a vehicle having a plurality of water level sensors about the body thereof, and a processor adapted to calculate from said sensors the orientation of the vehicle with respect to the horizontal.

Embodiments of the invention permit vehicle orientation to be determined absent a vehicle mounted inclination or attitude sensor. From a determination of orientation, many other vehicle systems may be enabled or disabled, such as a desired or predetermined traction mode, transmission ratio and ride height. Alternative embodiments of the invention permit a confidence check that orientation determined by other means is correct.

The water level sensors may comprise a capacitive or resistive water level sensor exposed in use to water at wading depth.

By exposed, we mean for example that the apparatus is attached to, or forms part of a surface which is not only contactable by the environment in which the vehicle is immersed, but is immersed to a level representative of the level of liquid external to the vehicle. In other words, when the vehicle is wading, the level of liquid about the sensor must be the same as the level of liquid external to the vehicle. For example, external surfaces of components in the engine bay are usually exposed to water at wading depth. Optionally, the sensor is positioned on a body component; i.e. a component which is substantially fixed in position relative to the engine air intake.

In one embodiment, the sensor is configured to detect water level over a prescribed range. Optionally, the sensor is configured to detect the water level either continuously or in a plurality of discrete levels. In one embodiment five such levels are provided.

Resistive or capacitive sensors rely on the electrical properties of a substance disposed between two electrodes. The resistance of water is lower than that of air (for a resistive sensor), and the dielectric constant of water is many times higher than air (for a capacitive sensor).

To provide a continuous measurement, the sensor may comprise a pair of elongate electrodes oriented in a vertical sense (with respect to the vehicle local coordinate system) and the water level may be determined by measuring the resistance/capacitance across the sensor electrodes. The change in water level will be generally proportional to the change in resistance or capacitance.

Alternatively, the sensor may provide a discrete, piecewise, measurement. In other words the sensor may comprise an array of electrode pairs oriented in the vertical sense, and the water level determined by a change in resistance/capacitance at the highest electrode pair. The sensor may comprise a single electrode on one side of the sensor and a plurality of electrodes on the opposing side, with the resistance or capacitance being sequentially measured between each of the plurality and the single opposing electrode. One electrode may be a component of the vehicle, such as a body panel or frame component.

Optionally, the sensor is positioned below the lowest water-critical component. For example, the sensor may be positioned below the engine air intake.

The sensor may be self-activating, or may be activated by a wading sensor which detects the presence of water at a low level with respect to the vehicle. The wading sensor may be an ultrasonic sensor, such as PDC (parking distance control) sensor, configured to detect the presence of water upon immersion thereof.

The vehicle may include an attitude sensor or angular orientation sensor, such as an accelerometer or gyroscope, and a water level detection system comprising a memory and a processor, in which the memory is configured to store a water level measurement from the water level sensor and a vehicle orientation from the attitude sensor, the memory further storing software executable by the processor to determine a water level on the vehicle at a position spaced from the water level sensor.

Advantageously, the sensor can therefore be placed at a position spaced apart from e.g. the air intake should packaging and/or functional requirements dictate.

The sensors may be positioned on the front subframe, radiator support pack, bumper beam, wheel arch liner, suspension knuckle, lower arms or similar components. Multiple sensors may be positioned across more than one component to measure water level at different heights in the vehicle body local coordinate system.

Multiple water level sensors may be positioned across more than one component of the vehicle spaced in the longitudinal and/or transverse directions of the vehicle.

Alternatively, the sensor may be provided on a dedicated component such as an elongate member extending substantially vertically in the car body.

According to still another aspect of the invention for which protection is sought there is provided a wading vehicle orientation measurement device comprising plurality of water level sensors for installation about a vehicle body, and a processor adapted to calculate from data received from said sensors the orientation of the vehicle with respect to the horizontal.

Optionally, the water level sensors comprise capacitive or resistive water level sensors, exposed in use to water at wading depth.

In some embodiments each of the water level sensors is configured to detect the level of water over a prescribed range.

Optionally, one or more of said water level sensors are configured to detect changes in the water level continuously. One or more of said water level sensors may be configured to detect changes in the water level in a plurality of discrete levels.

Optionally, a water level sensor may comprise a pair of elongate electrodes oriented in a vertical sense with respect to the vehicle local coordinate system such that the water level may be determined by measuring the resistance/capacitance across the sensor electrodes.

In embodiments of the invention a water level sensor comprises an array of electrode pairs oriented in a vertical sense with respect to the vehicle local coordinate system.

Optionally, a water level sensor may comprise a single electrode on a first side of the sensor and a plurality of electrodes on a second side of the sensor.

One of the electrodes may be formed from a component of the vehicle; such as a body component or frame component.

According to a further aspect of the invention for which protection is sought there is provided a vehicle comprising a plurality of vehicle mounted capacitive or resistive water level sensors positioned at different transverse and/or longitudinal positions in the vehicle body local coordinate system.

Optionally, the sensors are configured to detect a plurality of water levels, wherein the angular position of the vehicle body whilst wading can be determined, without recourse to an attitude sensor, by comparing the water level at different positions on the vehicle body.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF DRAWINGS

Embodiments of the present invention will now be described, by way of example only, with reference to the accompanying figures in which:

FIG. 3 is a schematic view of a sensor apparatus in accordance with an embodiment of the present invention;

FIG. 4 is a schematic view of a sensor apparatus according to another embodiment of the present invention;

FIG. 5 is a schematic view of a sensor apparatus according to another embodiment of the present invention;

DETAILED DESCRIPTION

Figure 1:
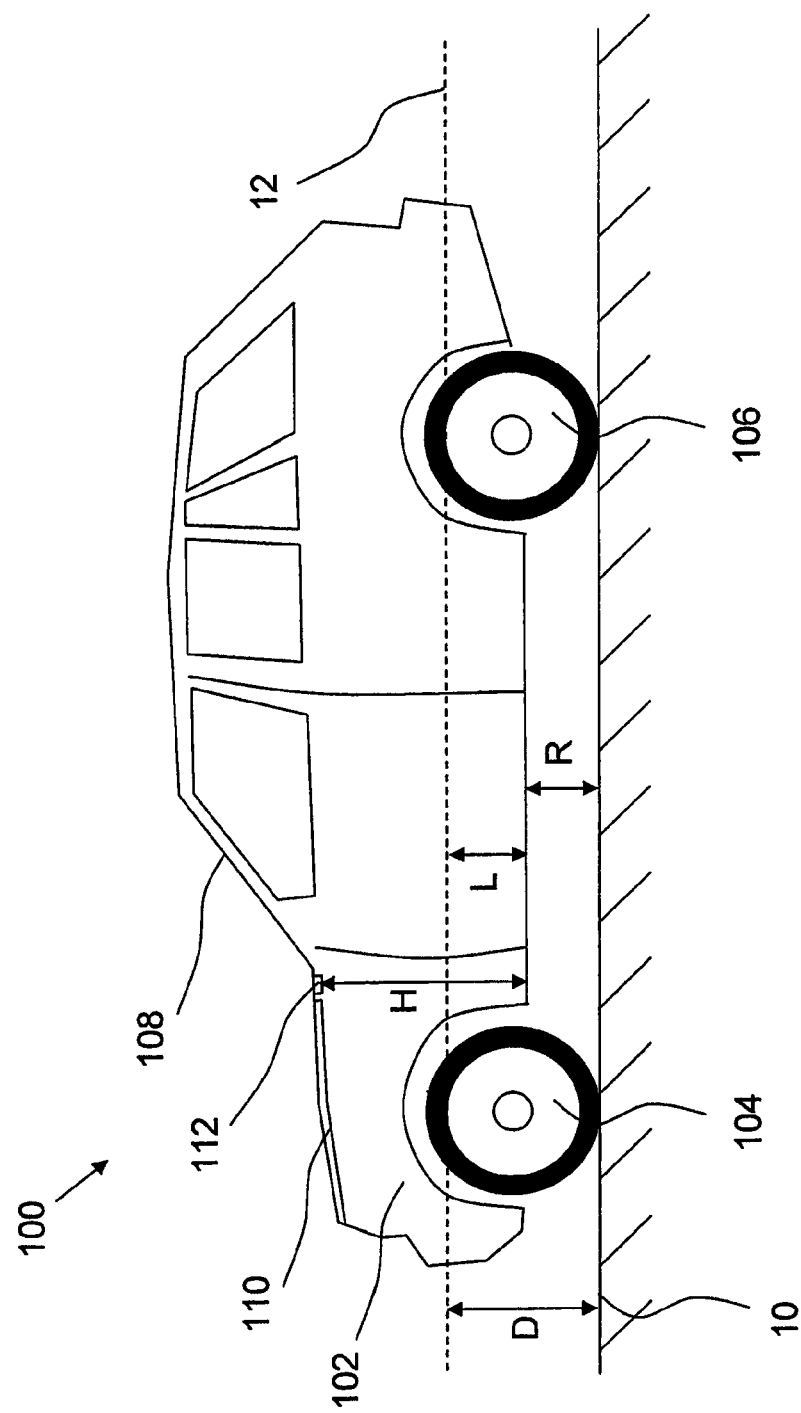
FIG. 1 is a schematic side view of a wading off-road vehicle comprising an apparatus according to embodiments of the present invention.

Referring to FIG. 1, a vehicle 100 comprises a body 102, a left front wheel 104 and a left rear wheel 106. The wheels 104, 106 (and their counterparts on the right hand side of the vehicle) are connected to the body 102 via a suspension (not shown). Each of the wheels 104, 106 comprises a tyre.

The wheels 104, 106 can move relative to the body 102 to define a ride height R between the lowermost point of the tyres (where they contact the ground) and the lowermost point on the body 102. The ride height R varies with suspension travel and may be varied by the driver (for example to move from an on-road mode when R is small to an off-road mode when R is large).

The body 102 comprises a windscreen 108 and a bonnet (or hood) 110 covering an engine bay. On the body 102 between the windscreen 108 and the bonnet 110 there is defined and engine intake orifice 112. The orifice 112 is connected to an air filter and intake manifold of the engine (not shown). The intake orifice 112 is positioned at a height H from the lowermost part of the body 102.

The vehicle 100 is shown wading through water 12 at a water depth D from a ground level 10. The water depth D should be distinguished from the water level represented by L which is the level of the water 12 above the lowermost point on the body 102.

It will be noted that although D can be measured (by a roadside gauge or a measuring stick); the distance L is unknown (as R can vary). In order to know whether the vehicle 100 can be taken through the water 12, the distance between the intake orifice 112 of the water level 10 needs to be determined.

Figure 2:
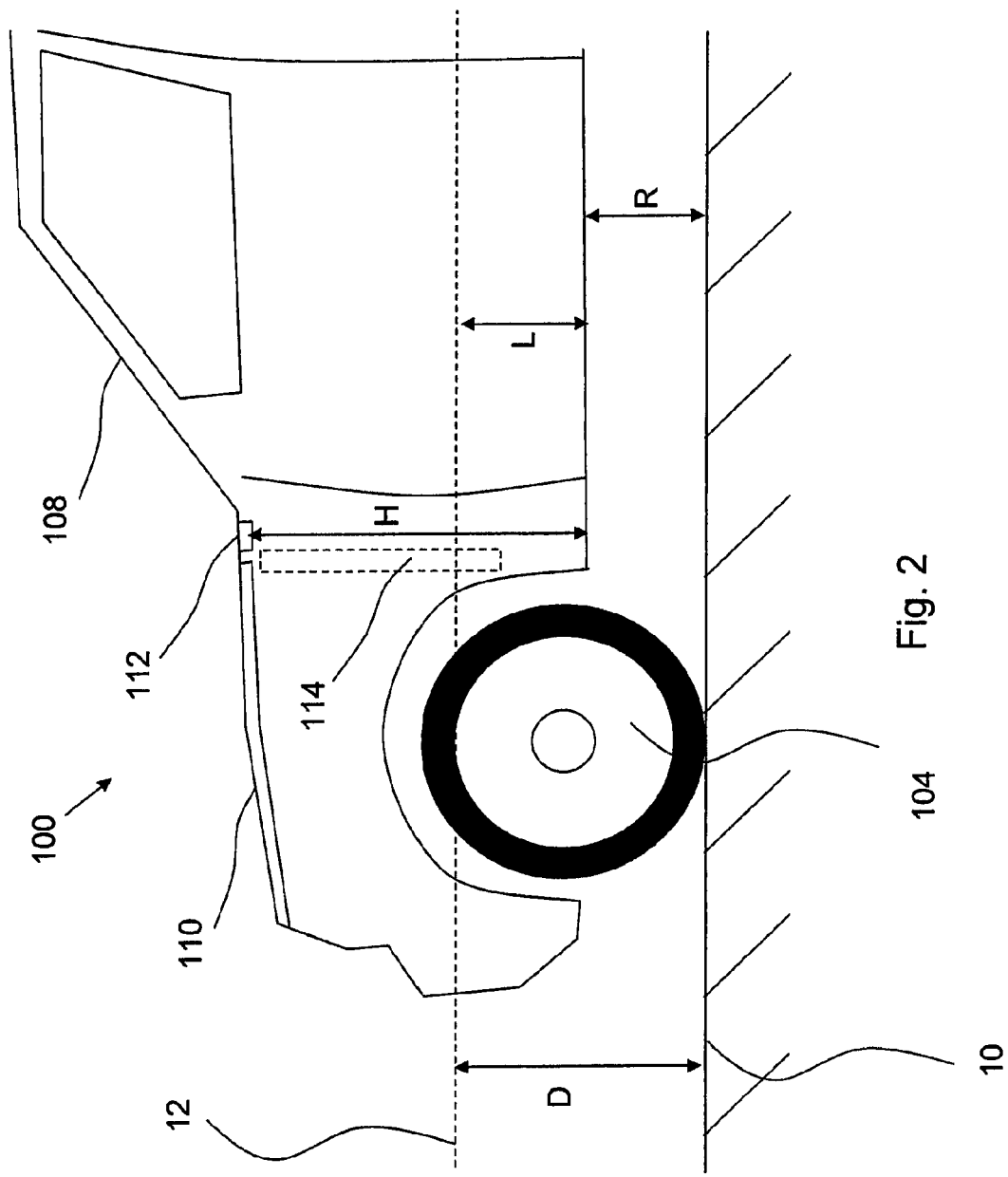
FIG. 2 is a detail view of a part of the vehicle of FIG. 1.

Referring to FIG. 2, the front section of the vehicle 100 is shown. A level sensing apparatus 114 according to an embodiment of the present invention is shown in hidden line and is positioned within the engine bay on the engine bay bulkhead. If convenient an apparatus 114 could be positioned close to the front (and/or optionally at the rear) of the vehicle 100.

In other embodiments of the invention the sensor 114 may be positioned on one or more of the following components, but not limited to, front subframe, radiator support pack, bumper beam, wheel arch liner, suspension knuckle, lower arms or other similar component. Advantageously, such components are less prone to interference or erroneous water level measurement since they are at least partially shielded from splashing and/or precipitation. Sensors placed on these locations may provide more reliable measurements of the depth of the water being waded through.

Turning to FIG. 3, the level sensing apparatus 114 is shown in schematic detail. The apparatus 114 comprises a resistive sensor 116 having a first conductive plate 118 and a second conductive plate 120 spaced therefrom. The plates 118, 120 are parallel and offset to define a gap 122 therebetween. Each plate 118, 120 is connected to an electrical circuit 124 which is configured to measure the resistance of the sensor 116 (for example by either applying a voltage across the plates and measuring the current in the circuit or applying a constant current and then measuring the voltage across the plates. In some embodiments both voltage and current may be measured. In yet other embodiments the resistance or capacitance may be measured by coupling the sensor to a signal generator such as an oscillator, for example a sine wave oscillator, and measuring a change in the frequency or wavelength of the signal)

The plates 118, 120 are elongate and, as the vehicle 100 wades, are at least partially submersed in water 12. Because the conductivity of water 12 is higher than that of air, the resistance of the sensor 116 will drop with increasing water level. There will be a linear relationship between length of the sensor electrodes immersed in water and the resistance of the sensor 116. If the sensor 116 is installed in a vertical plane then the water level L will be directly proportional to the resistance of the sensor. As such, once the sensor 116 is calibrated, the level L can be detected and the information provided to the vehicle systems and the driver. If the sensor 116 is installed on a non planar surface and/or the surface deviates from the vertical a different relationship will exist between the water level L and the resistance of the sensor 116, this will require a different calibration. For example the sensor 116 may be mounted on an arcuate surface of the wheel arch liner; a change in the water level L towards the lowermost end of the sensor 116 may result in a smaller change in the resistance of the sensor 116 than the same change in water level L towards the upper end of the sensor 116; since more of the sensor 116 may be immersed in water 12 as a result of the change in water level L in an upper region of the sensor than would be immersed in water 12 as a result of the same change in the water level L in a lower region of the sensor 116.

Turning to FIG. 4, there is illustrated an alternative sensor 216 according to another embodiment of the invention in which the sensor 216 comprises a series of electrode plate pairs each comprising a first electrode 218 and a second electrode 220. The pairs of plates are spaced in the vehicle height direction. One of the plates of each pair could comprise a vehicle body panel from which the other plate is separated by a dielectric material. Other electrically conductive components of the vehicle 100 could be used as one plate of the electrode pair.

In one embodiment, the resistance of the electrode pairs are simultaneously measured. It will be noted that the electrode pairs which are fully submerged will have a significantly lower resistance than the pairs that are not. Therefore the water level L can be measured by determining which is the highest of the electrode pairs with low resistance, since the height of each of electrode pairs with respect to the vehicle body 102 is known and the ride height R of the vehicle 100 is known the water level L can be calculated.

It will be noted that one of the electrode pairs may be partially submerged, and interpolation of resistance against the height of that electrode pair may be used to make the level measurement more accurate.

In an alternative embodiment, only one electrode pair at a time is measured, for example using a multiplexer. This will simplify the necessary circuitry. Each of the electrode pairs are measured sequentially, for example from the uppermost pair down to the lowermost pair or from the lowermost pair up to the uppermost pair. In alternative embodiments other sequences are envisaged.

An advantage of the embodiment of FIG. 4 is that because the system relies on discretely positioned electrode pairs, changes in the properties of the water will not significantly affect the level measured.

Turning to FIG. 5, there is illustrated a sensor 316 according to a further embodiment. The sensor 316 comprises a first electrode plate 318 and a series of second electrode plates 320. The sensor 316 works in a similar manner to the sensor 216, except that only the plates 320 need to be measured alternately (e.g. multiplexed).

It will be noted that all of the above embodiments may be used in a capacitive sense—that is the capacitance of the pairs of plates may be measured instead of the resistance on the assumption that the dielectric constant of water and air are different (as are their conductivity).

As will be understood, a plurality of water level sensors 116, 216, 316 placed about the periphery of a vehicle 100 may be used to allow the inclination or attitude of the vehicle 100 to be calculated.

Thus a series of water level readings at each corner of the vehicle 100 may indicate partial immersion as follows: front left 80 mm, front right 30 mm, rear left 80 mm, rear right 30 mm. These readings indicate a side to side angular tilt of the vehicle 100. Similarly fore and aft tilt may be determined, or a combination of side to side and fore and aft tilts.

Typically the calculation is determined in a processor of the vehicle 100 at a suitable refresh rate, and the result may be indicated to the driver by visual display. The angular orientation of the vehicle 100 may also enable or disable certain vehicle systems automatically, in order to best adapt the vehicle 100 to continuing motion, for example by engaging an appropriate traction mode or transmission ratio. The determined orientation may also allow warnings to be generated, both visual and audible, should the vehicle 100 approach the limits of capability.

Figure 6:
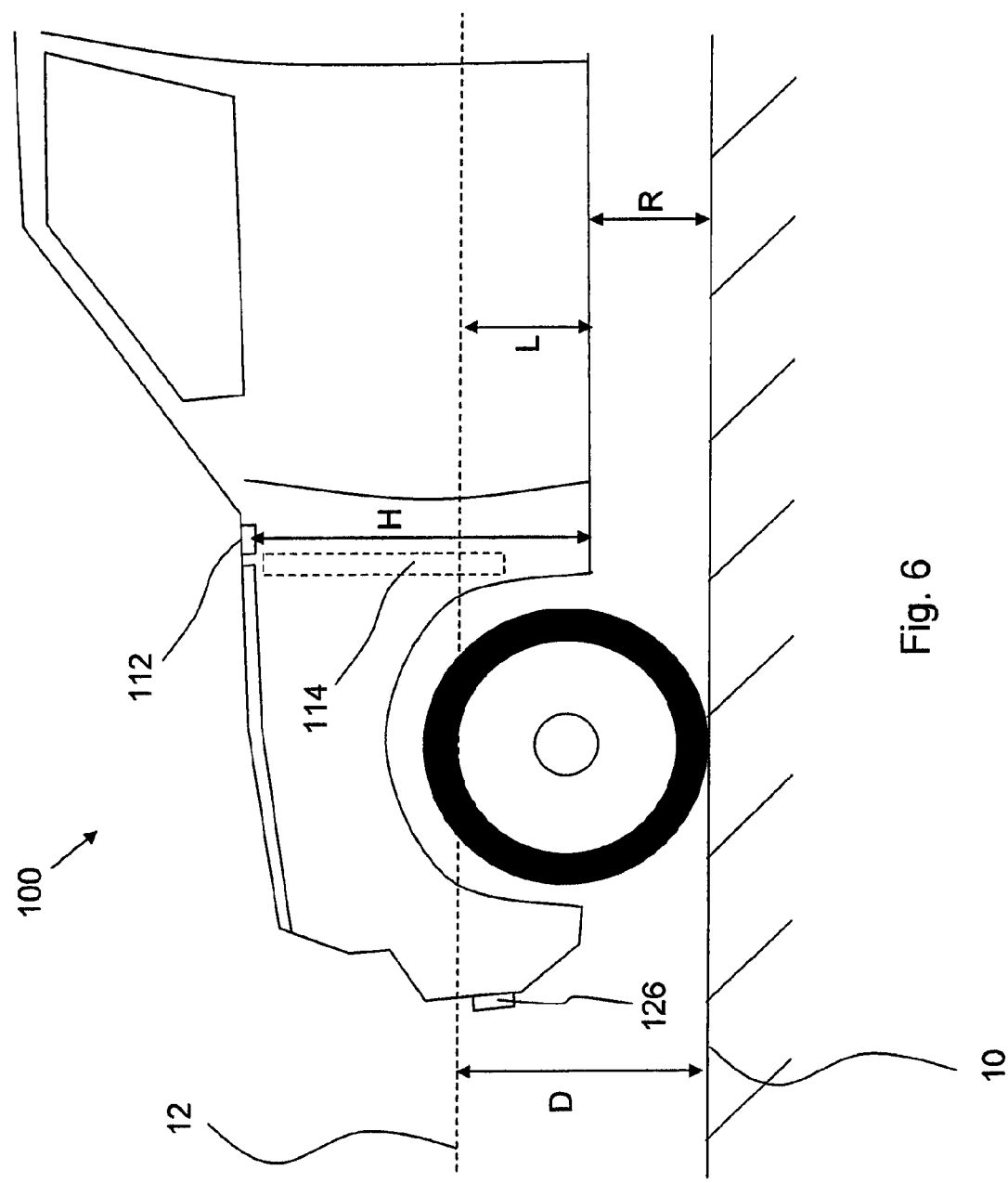
FIG. 6 is a schematic side view of a wading off-road vehicle comprising a second sensor apparatus according to embodiments of the present invention.

FIG. 6, illustrates yet another embodiment of the invention in which the vehicle 100 is shown having a measurement apparatus 114 as well as an ultrasonic sensor 126 mounted on the front of the vehicle 100. The sensor 126 could be a PDC (parking distance control) sensor.

The sensor 126 can be used to detect the presence of water 12 (the water 12 will affect the performance of the sensor) and this can trigger activation of the apparatus 114. Therefore the apparatus 114 can be dormant for most of the time except for when the vehicle 100 is wading. Alternatively, the apparatus 114 may be in a ready state, for example when the vehicle ignition switch is 'on' and be self activating.

Figure 7:
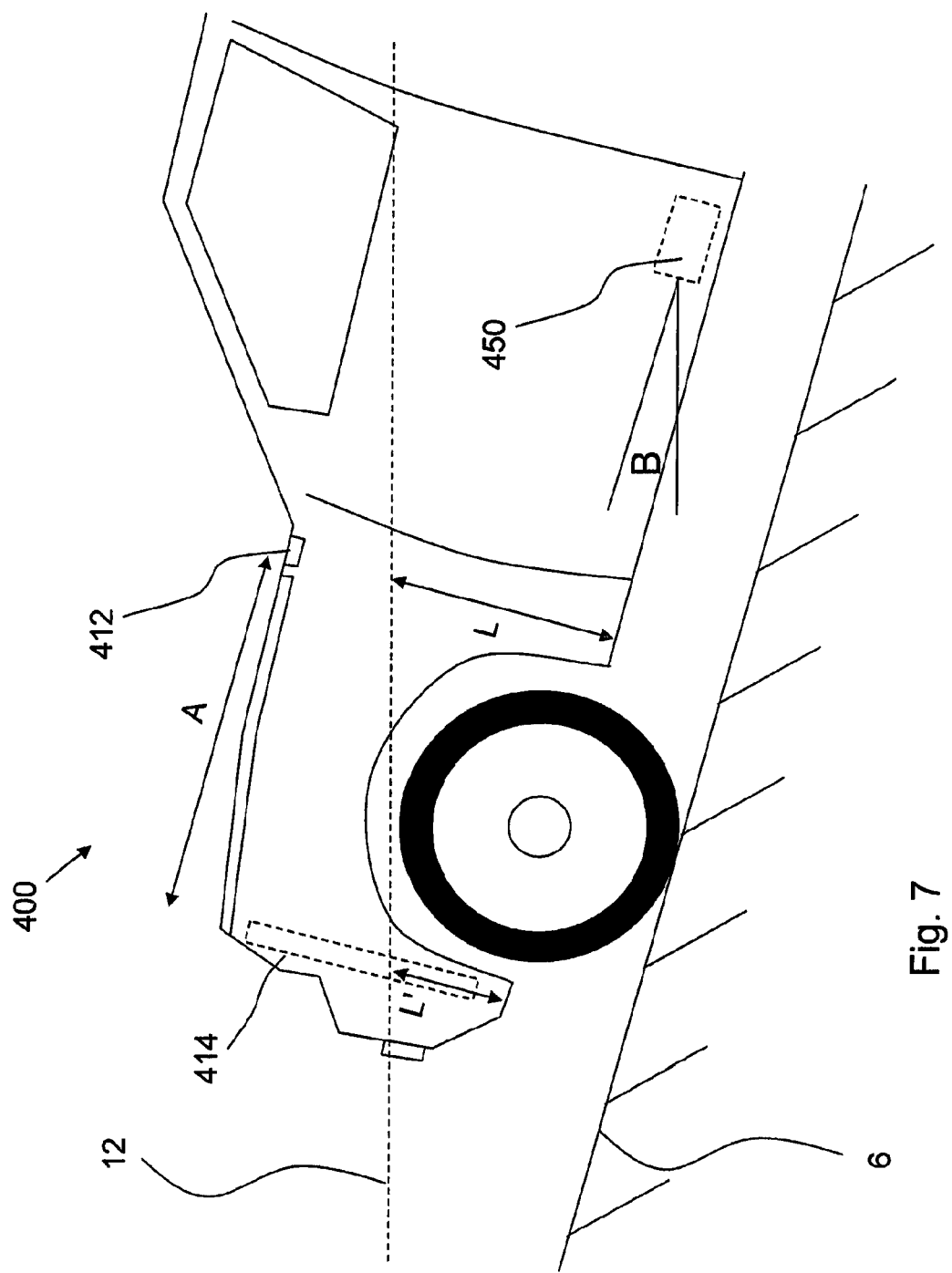
FIG. 7 is a schematic side view of a wading off-road vehicle comprising a third sensor apparatus according to embodiments of the present invention.

Referring to FIG. 7, there is shown an alternative embodiment of the present invention in which a vehicle 400 has an apparatus 414, similar to the apparatus 114, but positioned at a horizontal distance A (in the car body local coordinate system) from the air intake 412 towards the front of the vehicle 400. The apparatus 414 may be positioned away from the intake for ease of installation (for example packaging, access or wiring location).

The vehicle 400 is illustrated backing down a slope 6 (for example a slipway). The angle of the slope 6 shown in FIG. 7 is exaggerated for clarity.

The vehicle 400 may further comprise an angular orientation sensor 450 which detects the tilt angle B of the vehicle 400. As can be observed in FIG. 7, because the vehicle 400 is tilted, the water level L at the intake 412 is high, whereas the level L' measured by the sensing apparatus 414 would be lower. Therefore there is a risk that the driver may travel into unsuitable depths of water 12.

In order to compensate, the vehicle 400 comprises a memory and processor (not shown) configured to adjust the reading L' to compensate for the angle B. In this instance, since the horizontal distance A is known the level L can be calculated by, $$L = L' + A \cdot \tan(B).$$

The apparatus 414 may comprise sensor electrodes moulded into the wheel arch trim or similar.

Figure 8:
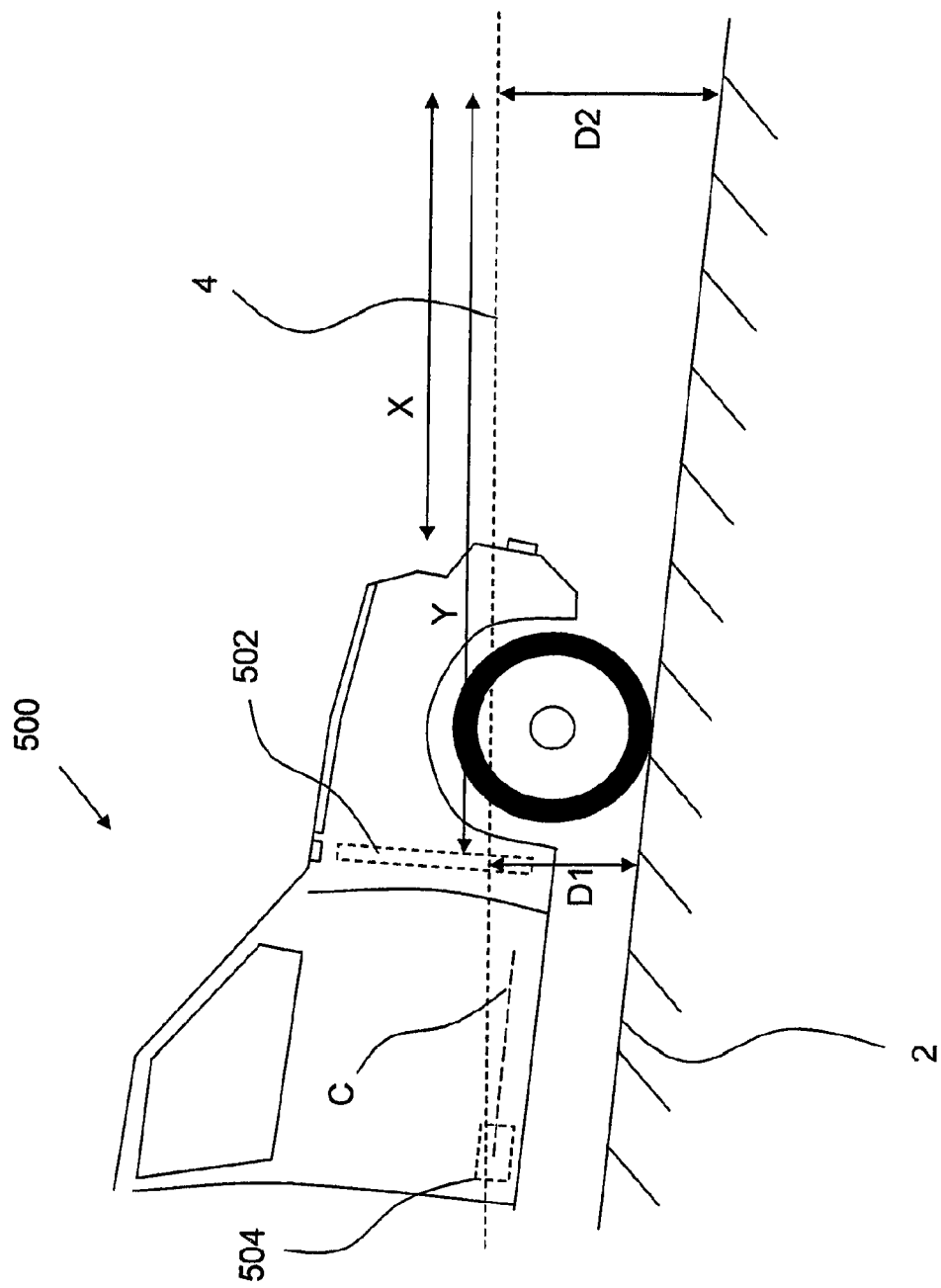
FIG. 8 is a schematic side view of a wading off-road vehicle comprising a fourth sensor apparatus according to embodiments of the present invention.

In a further embodiment of the present invention, shown in FIG. 8, a vehicle 500 is shown driving down an inclined slope 2 whilst wading through water 4. The vehicle 500 comprises a water level sensor 502 (similar to those described above, or alternatively the sensor could be a hydrostatic pressure sensor or any other sensor capable of measuring water depth) and a vehicle angular orientation sensor 504.

The water level sensor 502 measures a water level L which is combined with an on-board ride height measurement to provide a water depth D1 at the sensor 502. The angular orientation sensor 504 measures an inclination angle C of the vehicle 500.

The vehicle 500 comprises a processor and memory (not shown); the memory having software loaded thereon which is executable by the processor to estimate a depth D2 at a distance X from the front of the vehicle.

The depth D2 is calculated by the relation:

$$D2 = D1 + Y \cdot \tan C$$

where Y is the sum of the distance X and the distance from the front of the vehicle to the sensor 502.

The system allows the user to select values of X, and may display values of D2 for multiple values of X. FIG. 8 shows the system estimating depth in the direction of travel, but the system can also estimate depth in other directions (e.g. left and right) by using the roll angle of the vehicle 500 as well as the pitch angle.

Variations are possible within the scope of the present invention.

One or both of the electrodes may be a vehicle component. For example, the system may be configured to measure the resistance or the capacitance between two conductive but electrically isolated parts of the vehicle body, such as panels.

The apparatus may be provided as a retrofit system on a replacement vehicle component.

The present application claims priority to UK patent application numbers filed by the present applicant on 15 Dec. 2010 having the application numbers GB1021268.6, GB1021278.5, GB1021272.8, GB1021297.5, GB1021295.9 and GB1027296.7, the contents of each of which are expressly incorporated by reference in their entirety.

The present application is related to the PCT applications, filed concurrently with the present application, and naming at least one inventor in common with the present application, which are listed below:

1. PCT application No. PCT/EP2011/072998 to Thuy-Yung TRAN and Edward HOARE filed 15 Dec. 2011, entitled "Ultrasonic Wading Detection System for a Vehicle";
2. PCT application No. PCT/EP2011/072999 to Thuy-Yung TRAN and Edward HOARE, filed 15 Dec. 2011, entitled "Wading Detection System for a Vehicle";
3. PCT application No. PCT/EP2011/072986 to Thuy-Yung TRAN, Edward HOARE and Nigel CLARKE, filed 15 Dec. 2011, entitled "Vehicle Control System";
4. PCT application No. PCT/EP2011/072997 to Thuy-Yung TRAN, Edward HOARE and Nigel CLARKE, filed 15 Dec. 2011, entitled "Wading Depth Estimation For A Vehicle";
5. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";
6. PCT application No. PCT/EP2011/072991 to Thuy-Yung TRAN, Edward HOARE and Nigel CLARKE, filed 15 Dec. 2011, entitled "Wading Vehicle Depth Measurement Apparatus";
7. PCT application No. PCT/EP2011/072992 to Thuy-Yung TRAN, Edward HOARE, Anthony JONES, Simon THOMSON and Ashutosh TOMAR, filed 15 Dec. 2011, entitled "Wading Vehicle Water Level Display";
8. PCT application No. PCT/EP2011/072994 to Thuy-Yung TRAN, Edward HOARE, Anthony JONES, Simon THOMSON and Ashutosh TOMAR, filed 15 Dec. 2011, entitled "Wading Vehicle Water Level Display";
9. PCT application No. PCT/EP2011/072996 to Thuy-Yung TRAN, Edward HOARE, Anthony JONES, Simon THOMSON and Ashutosh TOMAR, filed 15 Dec. 2011, entitled "Wading Vehicle Advisory Speed Display".

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. A method of determining orientation of a wading vehicle, the method comprising:
   providing a plurality of capacitive or resistive water level sensors about the vehicle, each water level sensor comprising a pair of electrodes exposed, in use, to water at wading depth and wherein each water level sensor is configured to detect a water level over a prescribed range;
   determining a water level detected at said plurality of water level sensors;
   calculating an angular orientation of the vehicle from the outputs of said plurality of water level sensors; and
   generating one or more warnings that the vehicle is approaching limits of capability based on the calculated angular orientation;
   wherein each water level sensor is oriented vertically such that water level may be determined by measuring the resistance and/or capacitance across the electrodes of said water level sensor and such that each water level sensor is configured to detect changes in water level continuously or in a plurality of discrete levels; and
   wherein at least one of said plurality of water level sensors is activated by a wading sensor configured to detect the presence of water adjacent the vehicle and wherein said wading sensor is an ultrasonic sensor, configured to detect the presence of water upon immersion thereof.

2. A method according to claim 1, further comprising determining wading depth according to the capacitance or resistance of said water level sensors.

3. A method according to claim 2, further comprising providing a vertical array formed from said plurality of water level sensors, each water level sensor being independent so as to indicate a discrete wading depth.

4. A method according to claim 3 further comprising interrogating each water level sensor in the vertical array individually, in a predefined sequence.

5. A method according to claim 3 further comprising interrogating two or more of said water level sensors in the vertical array simultaneously.

6. A vehicle comprising:
   a plurality of capacitive or resistive water level sensors about a body thereof, each water level sensor comprising a pair of electrodes exposed, in use, to water at wading depth and wherein each water level sensor is configured to detect a water level over a prescribed range; and
   a processor configured to calculate from said water levels detected by the plurality of water level sensors an orientation of the vehicle with respect to a horizontal;
   wherein each water level sensor comprises a pair of elongate electrodes or an array of electrode pairs oriented in a vertical sense with respect to the vehicle local coordinate system, such that water level may be determined by measuring the resistance and/or capacitance across the electrodes of said water level sensor and such that each water level sensor is configured to detect changes in water level continuously or in a plurality of discrete levels; and
   at least one of said plurality of water level sensors is activated by a wading sensor configured to detect the presence of water adjacent the vehicle and wherein said wading sensor is an ultrasonic sensor, configured to detect the presence of water upon immersion thereof.

7. A vehicle according to claim 6, in which each water level sensor comprises a single electrode on a first side of the water level sensor and a plurality of electrodes on a second side of the water level sensor such that each water level sensor is configured to detect changes in the water level in a plurality of discrete levels.

8. A vehicle according to claim 6, wherein at least one of said electrodes is formed from a component of the vehicle, and wherein said component of the vehicle is selected from the group comprising a body component and a frame component.

9. A vehicle according to claim 6, in which at least one of said plurality of water level sensors is positioned below a lowest water-critical component of the vehicle.

10. A vehicle according to claim 6, wherein at least one of said plurality of water level sensors is positioned on a vehicle component selected from the group comprising: a front subframe, a radiator support pack, a bumper beam, a wheel arch liner, a suspension knuckle, a lower arm, a body component and a frame component.

11. A system for determining orientation of a wading vehicle comprising:
   a plurality of capacitive or resistive water level sensors for installation about a vehicle body, each water level sensor comprising a pair of electrodes exposed, in use, to water at wading depth and wherein each water level sensor is configured to detect a water level over a prescribed range; and
   a processor adapted to calculate from data received from said plurality of water level sensors an orientation of the vehicle with respect to the horizontal, and to generate one or more warnings that the vehicle is approaching limits of capability based on the calculated orientation;
   wherein each water level sensor is oriented vertically such that water level may be determined by measuring the resistance and/or capacitance across the electrodes of said water level sensor and such that each water level sensor is configured to detect changes in water level continuously or in a plurality of discrete levels; and
   wherein at least one of said plurality of water level sensors is activated by a wading sensor configured to detect the presence of water adjacent the vehicle and wherein said wading sensor is an ultrasonic sensor, configured to detect the presence of water upon immersion thereof.

12. A system according to claim 11, wherein, each water level sensor of said plurality of water level sensors comprises a single electrode on a first side of the water level sensor and a plurality of electrodes on a second side of the water level sensor.

13. A system according to claim 12, wherein one of the electrodes is formed from a component of the vehicle.

14. A vehicle comprising a plurality of vehicle mounted capacitive or resistive water level sensors positioned at different transverse and/or longitudinal positions in the vehicle body local coordinate system, each water level sensor comprising a pair of electrodes exposed, in use, to water at wading depth, and wherein each water level sensor is configured to detect a water level over a prescribed range, and further wherein the vehicle includes at least one processor that operates to determine the angular position of the vehicle body whilst wading, without recourse to an attitude sensor, by comparing the water level at different positions on the vehicle body, and one or more warnings that the vehicle is approaching limits of capability can be generated based on the determined angular position of the vehicle body;

wherein each water level sensor is oriented vertically such that water level may be determined by measuring the resistance and/or capacitance across the electrodes of said water level sensor and such that each water level sensor is configured to detect changes in water level continuously or in a plurality of discrete levels; and wherein at least one of said plurality of water level sensors is activated by a wading sensor configured to detect the presence of water adjacent the vehicle and wherein said wading sensor is an ultrasonic sensor, configured to detect the presence of water upon immersion thereof.

15. A vehicle comprising:

a plurality of capacitive or resistive water level sensors about a body thereof, each water level sensor comprising a pair of electrodes exposed, in use, to water at wading depth and wherein each water level sensor is configured to detect a water level over a prescribed range, and further wherein at least one of said plurality of water level sensors is activated by an ultrasonic wading sensor configured to detect, upon immersion, the presence of water adjacent the vehicle; and a processor configured to calculate from said water levels detected by the plurality of water level sensors an orientation of the vehicle with respect to a horizontal.

* * * * *